United States Patent
Kanematsu

(10) Patent No.: US 11,400,764 B2
(45) Date of Patent: Aug. 2, 2022

(54) TIRE

(71) Applicant: SUMITOMO RUBBER INDUSTRIES LTD., Kobe (JP)

(72) Inventor: Yoshiaki Kanematsu, Kobe (JP)

(73) Assignee: SUMITOMO RUBBER INDUSTRIES LTD., Kobe (JP)

(*) Notice: Subject to any disclaimer, the term of this patent is extended or adjusted under 35 U.S.C. 154(b) by 673 days.

(21) Appl. No.: 16/374,833

(22) Filed: Apr. 4, 2019

(65) Prior Publication Data

US 2019/0308466 A1  Oct. 10, 2019

(30) Foreign Application Priority Data

Apr. 6, 2018 (JP) .............................. JP2018-074059

(51) Int. Cl.
*B60C 11/12* (2006.01)
*B60C 11/03* (2006.01)

(52) U.S. Cl.
CPC ...... *B60C 11/1204* (2013.01); *B60C 11/1236* (2013.01); *B60C 11/1263* (2013.01); *B60C 2011/0365* (2013.01); *B60C 2011/1209* (2013.01); *B60C 2011/1213* (2013.01)

(58) Field of Classification Search
CPC ............. B60C 11/1236; B60C 11/1263; B60C 11/1281; B60C 2011/0381
See application file for complete search history.

(56) References Cited

U.S. PATENT DOCUMENTS

| 2003/0029537 A1* | 2/2003 | Iwamura | B60C 11/12 |
| | | | 152/209.18 |
| 2014/0137999 A1* | 5/2014 | Nishiwaki | B60C 11/12 |
| | | | 152/209.8 |

FOREIGN PATENT DOCUMENTS

| EP | 2465708 | * | 6/2012 |
| JP | H04-230407 | * | 8/1992 |
| JP | H11-245631 | * | 9/1999 |
| JP | 2017-144763 A | | 8/2017 |

OTHER PUBLICATIONS

English machine translation of JPH11-245631. (Year: 1999).*
English machine translation of EP 2465708. (Year: 2012).*
English machine translation of JPH04-230407 (Year: 1992).*

* cited by examiner

*Primary Examiner* — Robert C Dye
(74) *Attorney, Agent, or Firm* — Oblon, McClelland, Maier & Neustadt, L.L.P.

(57) ABSTRACT

A tire includes a tread part including a land portion such that the land portion has a tread surface formed between a first edge extending in a tire circumferential direction and a second edge extending in the tire circumferential direction. The land portion includes long sipes, middle sipes, and short sipes such that each of the long sipes is extending from the first edge to the second edge, that each of the middle sipes is extending from one of the first edge and the second edge and terminating in the land portion at a point beyond a tire axial direction center position of the land portion, and that each of the short sipes is extending from one of the first edge and the second edge and terminating in the land portion without extending to a point beyond the center position.

20 Claims, 8 Drawing Sheets

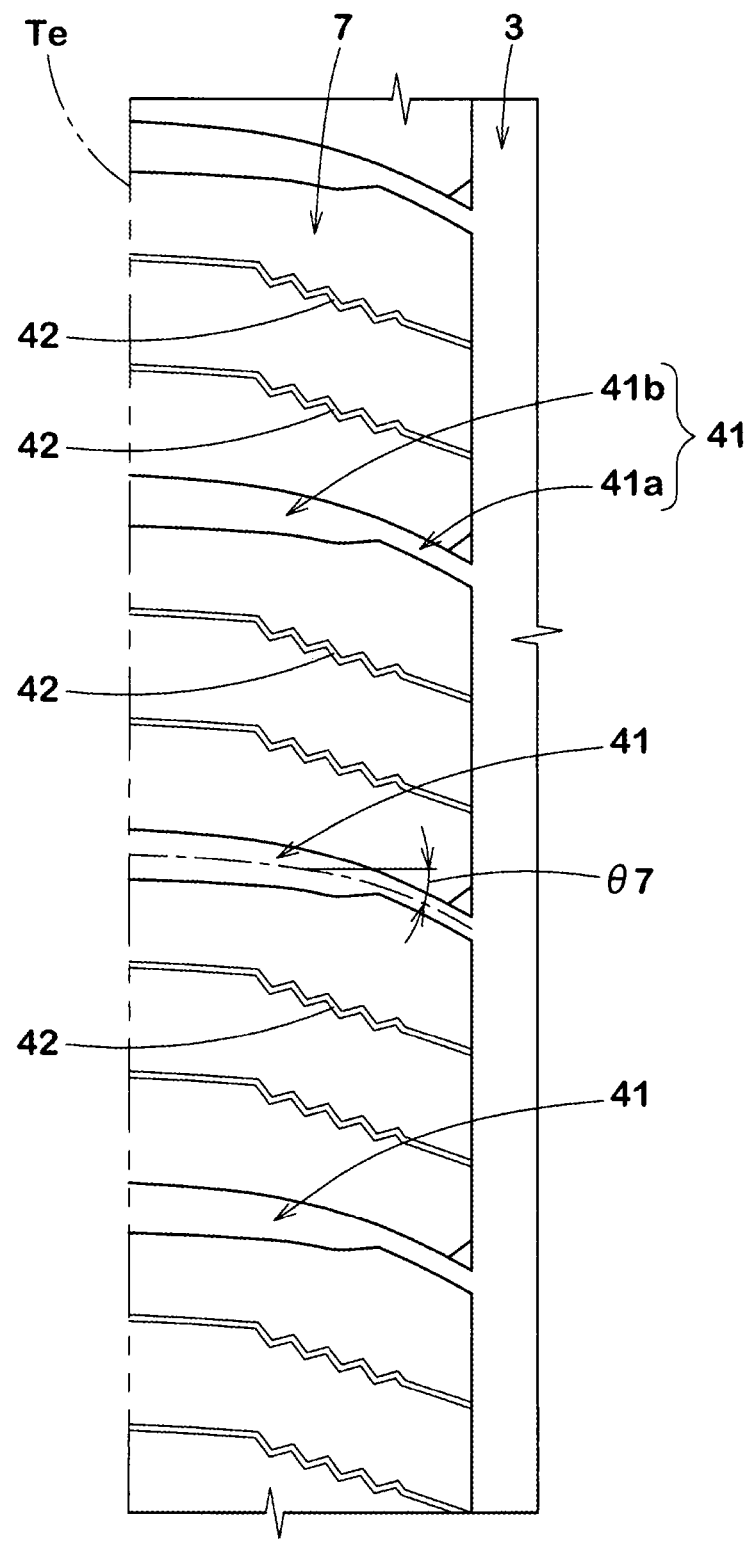

TIRE

CROSS-REFERENCE TO RELATED APPLICATIONS

The present application is based upon and claims the benefit of priority to Japanese Patent Application No. 2018-074059, filed Apr. 6, 2018, the entire contents of which are incorporated herein by reference.

BACKGROUND OF THE INVENTION

Field of the Invention

The present invention relates to a tire having sipes in a land portion.

Description of Background Art

For example, Japanese Patent Laid-Open Publication No. 2017-144763 describes a tire in which sipes are provided in a land portion to improve traveling performance on snow and ice. The entire contents of this publication are incorporated herein by reference.

SUMMARY OF THE INVENTION

According to one aspect of the present invention, a tire includes a tread part including a land portion such that the land portion has a tread surface formed between a first edge extending in a tire circumferential direction and a second edge extending in the tire circumferential direction. The land portion includes long sipes, middle sipes, and short sipes such that each of the long sipes is extending from the first edge to the second edge, that each of the middle sipes is extending from one of the first edge and the second edge and terminating in the land portion at a point beyond a tire axial direction center position of the land portion, and that each of the short sipes is extending from one of the first edge and the second edge and terminating in the land portion without extending to a point beyond the center position.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 7 is an enlarged view of a shoulder land portion of FIG. 1.

DETAILED DESCRIPTION OF THE EMBODIMENTS

Figure 1:
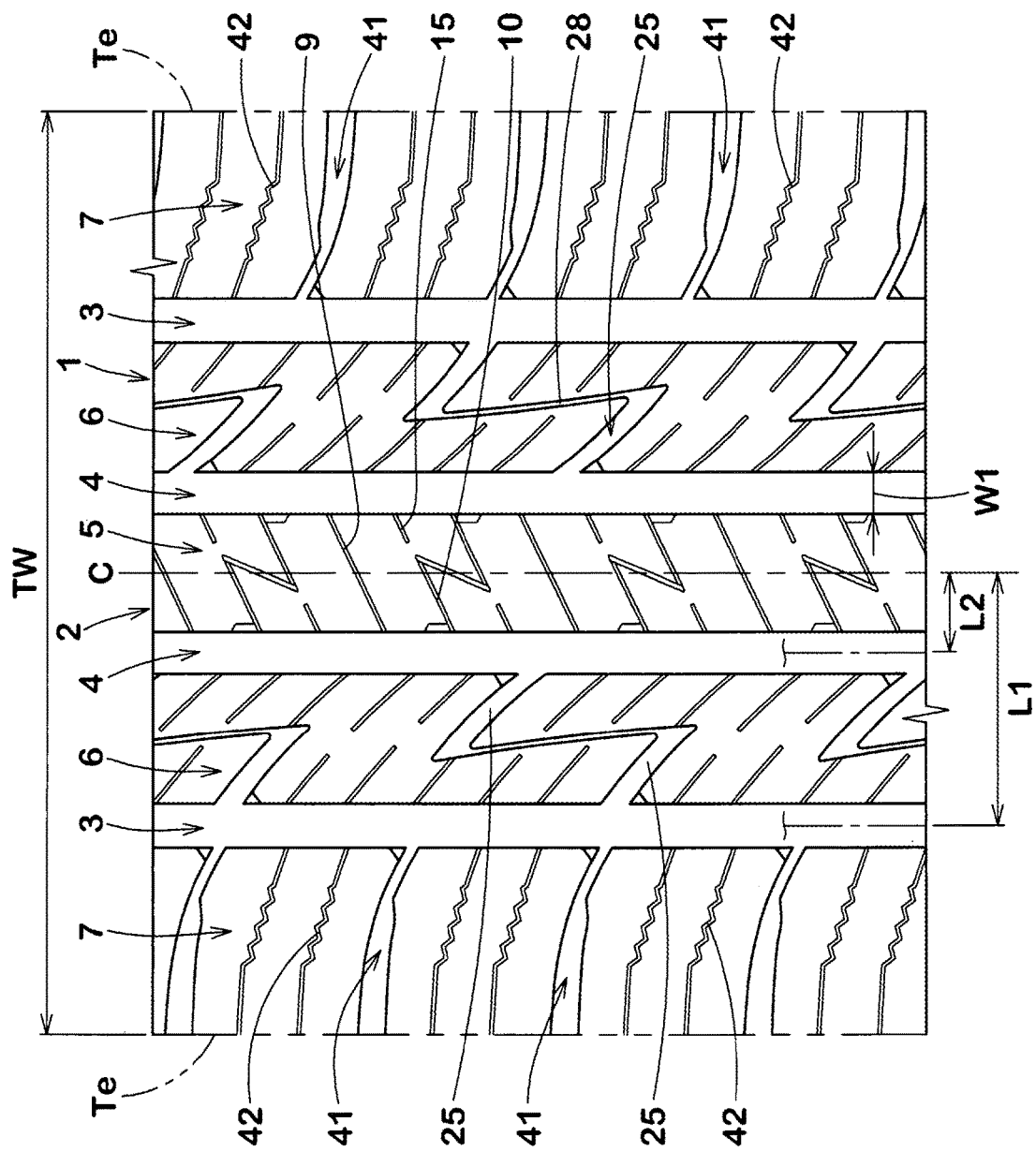
FIG. 1 is a developed view of a tread part of a tire of an embodiment of the present invention.

Embodiments will now be described with reference to the accompanying drawings, wherein like reference numerals designate corresponding or identical elements throughout the various drawings.

FIG. 1 is a developed view of a tread part 2 of a tire 1 of the present embodiment. The tire 1 of the present embodiment is, for example, a pneumatic tire for a passenger car, and can be suitably used for all seasons and can also be used for traveling on snow and ice. However, the tire 1 according to an embodiment of the present invention is not limited to such an embodiment.

As illustrated in FIG. 1, for the tread part 2 of the tire 1 of the present embodiment, for example, a mounting orientation for mounting the tire 1 to a vehicle is not specified. In a desirable embodiment, the tread part 2 has, for example, a point symmetric tread pattern.

In the tread part 2, multiple main grooves each continuously extending in a tire circumferential direction are provided. The multiple main grooves include, for example, shoulder main grooves 3 respectively arranged on tread edge (Te) sides, and crown main grooves 4 respectively arranged between the shoulder main grooves 3 and a tire equator (C). The shoulder main grooves 3 and the crown main grooves 4 each extend in a linear shape. However, the present invention is not limited to such an embodiment. For example, the shoulder main grooves 3 and the crown main grooves 4 may each extend in a zigzag shape.

In the case of a pneumatic tire, the tread edges (Te) are respectively tire axial direction outermost side ground contact positions when the tire 1 in a normal state is loaded with a normal load and is grounded on a flat surface at a camber angle of 0 degree. The term "normal state" refers to a state in which the tire is mounted to a normal rim and is filled with air at a normal internal pressure, and is not loaded. In the present specification, unless otherwise specified, values of dimensions and the like of the parts of the tire are values measured in the normal state.

The term "normal rim" refers to a rim for which standards are set for each tire in a system of standards that includes standards on which the tire is based. For example, the term "normal rim" refers to a "Standard Rim" in the JATMA standards, a "Design Rim" in the TRA standards, or a "Measuring Rim" in the ETRTO standards.

The term "normal internal pressure" refers to an air pressure for which standards are set for each tire in a system of standards that includes the standards on which the tire is based, and refers to a "Highest Air Pressure" in the JATMA standards, a maximum value published in the table "Tire Load Limits at Various Cold Inflation Pressures" in the TRA standards, or an "Inflation Pressure" in the ETRTO standards.

The term "normal load" refers to a load for which standards are set for each tire in a system of standards that includes the standards on which the tire is based, and refers to a "Maximum Load Capacity" in the JATMA standards, a maximum value published in the table "Tire Load Limits at Various Cold Inflation Pressures" in the TRA standards, or a "Load Capacity" in the ETRTO standards.

A distance (L1) from the tire equator (C) to a groove center line of each of the shoulder main grooves 3 is desirably, for example, 0.20-0.30 times a tread width (TW).

A distance (L2) from the tire equator (C) to a groove center line of each of the crown main grooves 4 is desirably, for example, 0.05-0.15 times the tread width (TW). The tread width (TW) is a tire axial direction distance from the tread edge (Te) on one side to the tread edge (Te) on the other side in the normal state.

The main grooves desirably each have a groove width (W1) of, for example, 3.0-6.0% of the tread width (TW). Such main grooves can improve performance on snow and ice and steering stability on a dry road surface in a well-balanced manner.

By providing the above-described main grooves, multiple land portions are formed in the tread part 2. In the tread part 2 of the present embodiment, a crown land portion 5, middle land portions 6 and shoulder land portions 7 are formed. The crown land portion 5 is formed between the two crown main grooves 4. The middle land portions 6 are each formed between one of the crown main grooves 4 and one of the shoulder main grooves 3. The shoulder land portions 7 are each formed between one of the shoulder main grooves 3 and one of the tread edges (Te). The tread part 2 of the present embodiment is divided into five land portions. However, the present invention is not limited to such an embodiment. For example, in a tire according to an embodiment of the present invention, it is also possible that the tread part 2 is divided into four land portions.

Figure 2:
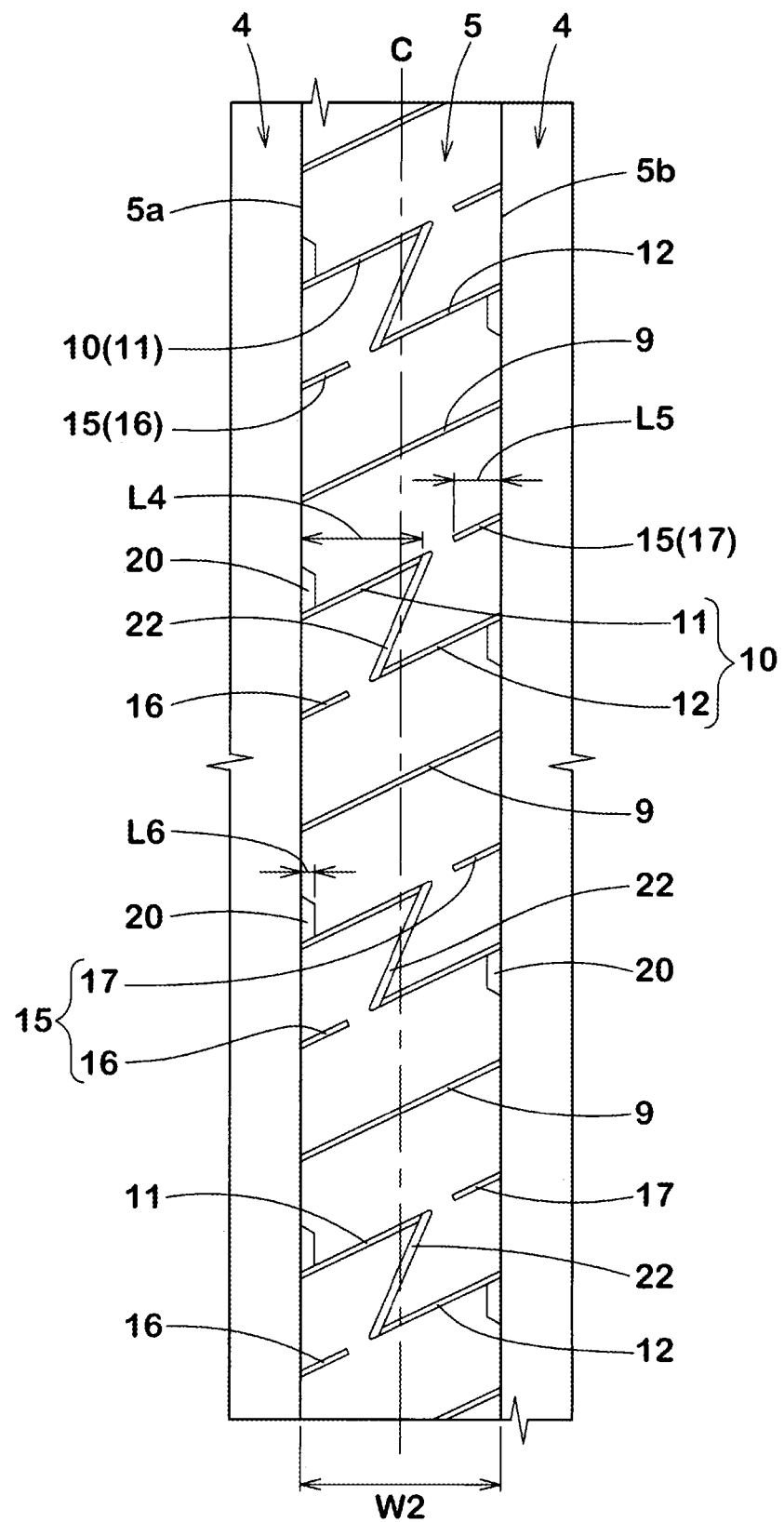
FIG. 2 is an enlarged view of a crown land portion of FIG. 1.

As a diagram describing an example of one of the land portions, FIG. 2 illustrates an enlarged view of the crown land portion 5. As illustrated in FIG. 2, the crown land portion 5 has a tread surface demarcated by a first edge (5a) extending in the tire circumferential direction and a second edge (5b) extending in the tire circumferential direction. The first edge (5a) and the second edge (5b) include not only edges extending along the tire circumferential direction but also edges formed by lug grooves connecting to the crown main grooves 4.

In the crown land portion 5, long sipes 9, middle sipes 10 and short sipes 15 are provided. In the present specification, the term "sipe" means a slit having a width of less than 0.8 mm.

Figure 3:
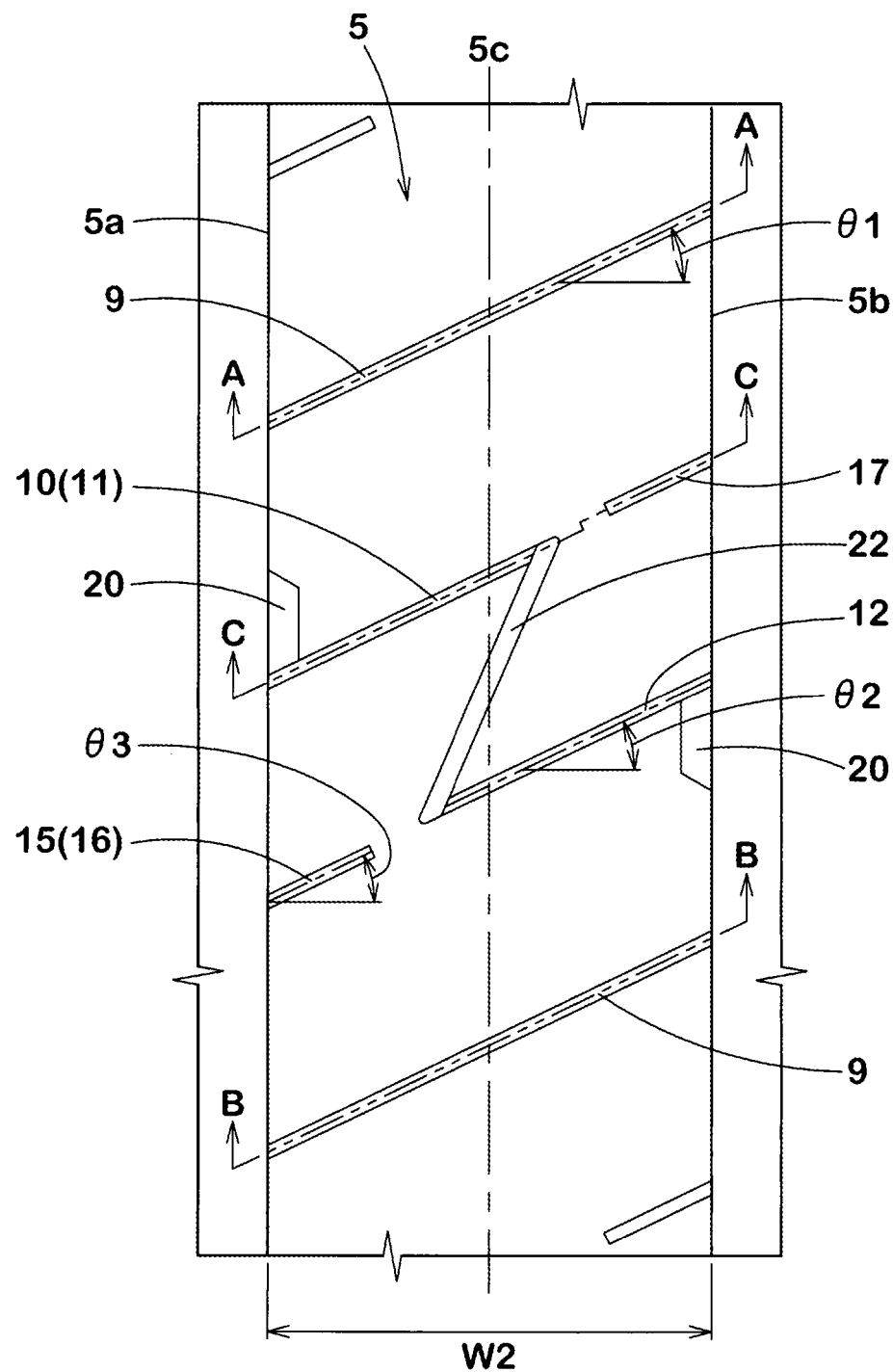
FIG. 3 is an enlarged view of long sipes, middle sipes and short sipes of FIG. 2.

FIG. 3 illustrates an enlarged view of the long sipes 9, the middle sipes 10 and the short sipes 15. As illustrated in FIG. 3, the long sipes 9 each extend from the first edge (5a) to the second edge (5b). The middle sipes 10 each extend from the first edge (5a) or the second edge (5b) and terminate within the land portion at a point beyond a tire axial direction center position (5c) of the land portion. The short sipes 15 each extend from the first edge (5a) or the second edge (5b) and terminate within the land portion without extending to a point beyond the center position (5c) of the land portion.

The sipes can increase a frictional force with edges thereof when traveling on snow and ice. Since the middle sipes 10 each terminate at a point beyond the center position of the land portion, a relatively large frictional force is generated near the center position (5c) while excessive reduction in rigidity of the land portion is suppressed. Since the short sipes 15 each terminate without extending to a point beyond the center position (5c) of the land portion, reduction in rigidity of the land portion can be significantly suppressed and steering stability on a dry road surface can be maintained. Further, the sipes each have one end communicatively connected to the first edge (5a) or the second edge (5b), and thus can moderately open and can increase a frictional force on snow and ice. Therefore, a tire according to an embodiment of the present invention can achieve both the steering stability on a dry road surface and the performance on snow and ice.

In the present embodiment, the above-described sipe elements are arranged in the crown land portion 5. Therefore, a high ground contact pressure acts on the sipes and the performance on snow and ice can be significantly improved. However, the present invention is not limited to such an embodiment, and the above-described sipe elements may also be arranged in the middle land portions 6 or the shoulder land portions 7.

The long sipes 9 are desirably inclined, for example, with respect to the tire axial direction. The long sipes 9 of the present embodiment are inclined, for example, in the same direction from the first edge (5a) to the second edge (5b) with respect to the tire axial direction, and each extend in a linear shape in a desirable embodiment. Further, the long sipes 9 each extend with a constant width from the first edge (5a) to the second edge (5b).

An angle ($\theta 1$) of each of the long sipes 9 with respect to the tire axial direction is desirably, for example, 20-30 degrees. Such long sipes 9 can provide a frictional force on snow and ice also in the tire axial direction and thus can improve turning performance.

Figure 4A:
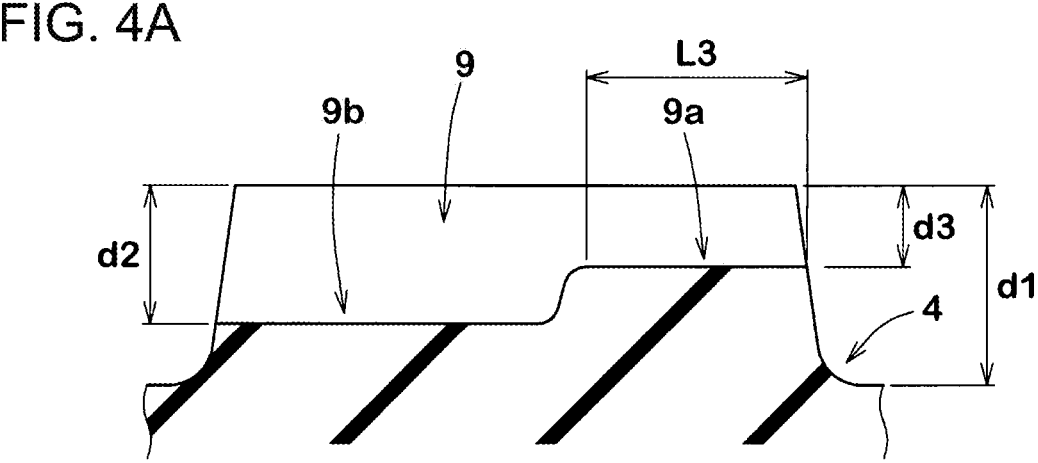
FIG. 4A is an A-A line cross-sectional view of FIG. 3.

In the crown land portion 5 of the present embodiment, the multiple long sipes 9 are provided along the tire circumferential direction. FIG. 4A illustrates an A-A line cross-sectional view of one of the long sipes 9. As illustrated in FIG. 4A, the long sipes 9 each include a shallow portion (9a) and a deep portion (9b) having a larger depth than the shallow portion (9a).

The shallow portion (9a) is provided, for example, in a region including one tire axial direction end portion of each of the long sipes 9. Further, the shallow portion (9a) of the present embodiment does not cross the center position (5c) (illustrated in FIG. 3) of the crown land portion 5. The shallow portion (9a) desirably has a tire axial direction length (L3) of, for example, 0.35-0.45 times a tire axial direction width (W2) (illustrated in FIG. 2) of the crown land portion 5. Such a shallow portion (9a) can ensure a moderate opening amount of each of the long sipes 9 while suppressing a decrease in steering stability on a dry road surface.

From the same point of view, a depth (d3) of the shallow portion (9a) is desirably, for example, 0.50-0.65 times a depth (d2) of the deep portion (9b).

The deep portion (9b) desirably crosses, for example, the center position of the crown land portion 5. The long sipes 9 each having such a deep portion (9b) can improve the performance on snow and ice.

The depth (d2) of the deep portion (9b) is desirably, for example, 0.60-0.80 times a depth (d1) of each of the crown main grooves 4. Such a deep portion (9b) can improve the steering stability on a dry road surface and the performance on snow and ice in a well-balanced manner.

Figure 4B:
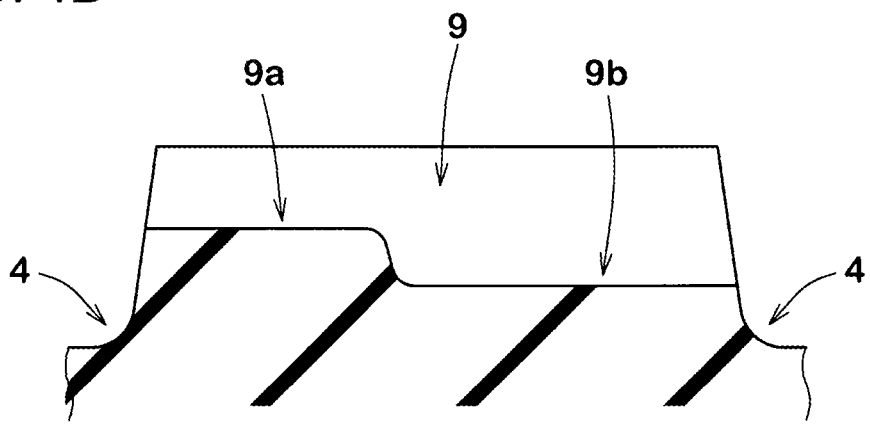
FIG. 4B is a B-B line cross-sectional view of FIG. 3.

FIG. 4B illustrates a B-B line cross-sectional view of another one of the long sipes 9 adjacent to the one of the long sipes 9 illustrated in FIG. 4A. As illustrated in FIG. 4B, in the crown land portion 5 of the present embodiment, multiple kinds of long sipes 9 are provided which are different from each other in tire axial direction position at which the shallow portion (9a) is provided.

As illustrated in FIGS. 4A and 4B, in the crown land portion 5 of the present embodiment, long sipes 9 each having a shallow portion (9a) provided in a region including an end portion thereof on one tire axial direction side and long sipes 9 each having a shallow portion (9a) provided in a region including an end portion thereof on the other tire axial direction side are alternately provided in the tire circumferential direction. In a further desirable embodiment, the deep portion (9b) of each of the long sipes 9 crosses the center position (5c) of the crown land portion 5. Such an arrangement of the long sipes 9 can achieve superior performance on snow and ice, and can uniformly relax the rigidity of the land portion and suppress uneven wear of the land portion.

As illustrated in FIG. 2, the middle sipes 10 desirably each have a tire axial direction length (L4) of, for example, 0.55-0.65 times the tire axial direction width (W2) of the crown land portion 5. Further, the short sipes 15 desirably each have a tire axial direction length (L5) of, for example, 0.15-0.30 times the tire axial direction width (W2) of the crown land portion 5.

As illustrated in FIG. 3, the middle sipes 10 include, for example, first middle sipes 11 each extending from the first edge (5a), and second middle sipes 12 each extending from the second edge (5b). The short sipes 15 include, for example, first short sipes 16 each extending from the first edge (5a), and second short sipes 17 each extending from the second edge (5b). In the present embodiment, the first middle sipes 11 are respectively adjacent to the second short sipes 17, and the second middle sipes 12 are respectively adjacent to the first short sipes 16. In the present embodiment, between each two of the long sipes 9, a sipe pair including one of the first middle sipes 11 and one of the second short sipes 17 and a sipe pair including one of the second middle sipes 12 and one of the first short sipes 16 are arranged.

The middle sipes 10 and the short sipes 15 each extend, for example, in a linear shape. The middle sipes 10 and the short sipes 15 have the same structure as the above-described long sipes 9 regarding an angle with respect to the tire axial direction. As a result, the long sipes 9, the middle sipes 10 and the short sipes 15 are inclined in the same direction with respect to the tire axial direction. In a further desirable embodiment, the long sipes 9, the middle sipes 10 and the short sipes 15 extend parallel to each other. Further, an angle (θ2) of each of the middle sipes 10 with respect to the tire axial direction and an angle (θ3) of each of the short sipes 15 with respect to the tire axial direction are desirably, for example, 20-30 degrees.

In the crown land portion 5, sipes of the same kind are desirably not continuously arranged in the tire circumferential direction. In other words, on both tire circumferential direction sides of each of the long sipes 9, one of the middle sipes 10 or one of the short sipes 15 is adjacently arranged. On both tire circumferential direction sides of each of the middle sipes 10, one of the long sipes 9 or one of the short sipes 15 is adjacently arranged. On both tire circumferential direction sides of each of the short sipes 15, one of the long sipes 9 or one of the middle sipes 10 is adjacently arranged. Such an arrangement of the sipes can suppress uneven wear of the land portion while achieving the above-described effects.

From the same point of view, the sipes are desirably arranged, for example, at equal intervals in the tire circumferential direction.

The short sipes 15 are desirably respectively arranged on extension lines of the middle sipes 10 or with ±2 mm deviations with respect to the extension lines. More specifically, the first short sipes 16 are respectively arranged with ±2 mm deviations with respect to the extension lines of the second middle sipes 12. The second short sipes 17 are respectively arranged with ±2 mm deviations with respect to the extension lines of the first middle sipes 11.

Figure 4C:
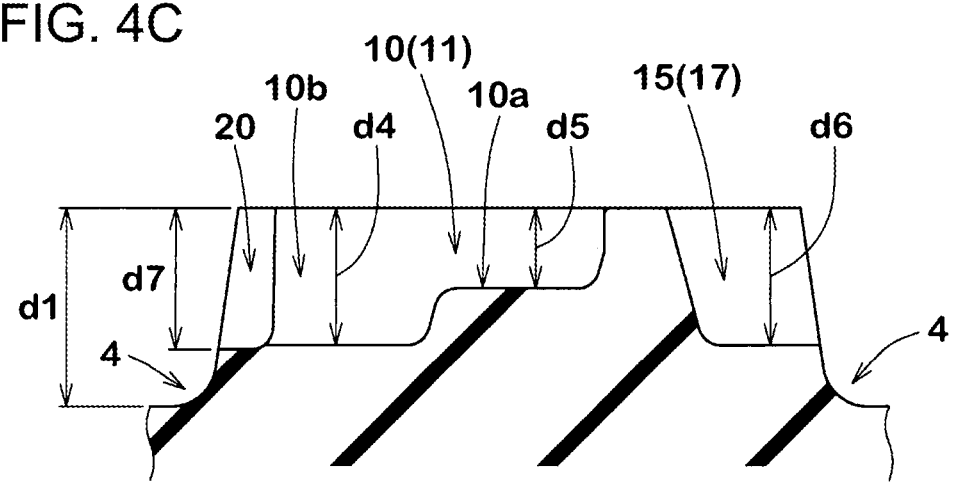
FIG. 4C is a C-C line cross-sectional view of FIG. 3.

FIG. 4C illustrates a C-C cross-sectional view of one of the middle sipes 10 and one of the short sipes 15. FIG. 4C is a cross-sectional view of one of the first middle sipes 11 and one of the second short sipes 17. As illustrated in FIG. 4C, the middle sipes 10 each have, for example, a deep portion (10b) on a crown main groove 4 side, and a shallow portion (10a) on a terminating end side in the crown land portion 5. The shallow portion (10a) of each of the middle sipes 10 desirably crosses, for example, the center position (5c) of the crown land portion 5. Such middle sipes 10 are helpful in maintaining the steering stability on a dry road surface.

A depth (d4) of the deep portion (10b) is, for example, 0.60-0.80 times the depth (d1) of each of the crown main grooves 4. A depth (d5) of the shallow portion (10a) is, for example, 0.50-0.65 times the depth (d4) of the deep portion (10b). Such middle sipes 10 are helpful in achieving both the steering stability on a dry road surface and the performance on snow and ice.

The short sipes 15 each have, for example, a constant depth. A maximum depth (d6) of each of the short sipes 15 is, for example, 0.60-0.80 times the depth (d1) of each of the crown main grooves 4. In a further desirable embodiment, the short sipes 15 each have, for example, the same depth as the deep portion (10b) of each of the middle sipes 10.

As illustrated in FIG. 2, lug grooves 20 are desirably respectively provided at crown main groove 4 side end portions of the middle sipes 10. For example, one end of each of the lug grooves 20 is connected to one of the crown main grooves 4 and the other end of the each of the lug grooves 20 terminates in the crown land portion 5. The lug grooves 20 each have a tire axial direction length (L6) of, for example, 0.05-0.10 times the width (W2) of the crown land portion 5. Such lug grooves 20 can further improve the performance on snow and ice.

The lug grooves 20 desirably each have a depth, for example, larger than the maximum depth of each of the middle sipes 10. A depth (d7) (illustrated in FIG. 4C) of each of the lug grooves 20 is desirably, for example, 0.60-0.80 times the depth (d1) of each of the crown main grooves 4.

As illustrated in FIG. 3, in the crown land portion 5, shallow grooves 22 are desirably provided that respectively connect terminating ends of the first middle sipes 11 to terminating ends of the second middle sipes 12. The shallow grooves 22 each have a groove width of 0.8 mm or more, and, more specifically, each have a groove width of 0.8-1.5 mm. Further, the shallow grooves 22 desirably each have a depth, for example, smaller than that of the shallow portion of each of the long sipes 9 or the middle sipes 10. The depth of each of the shallow grooves 22 is, for example, 1.5-2.5 mm. Such shallow grooves 22 can further improve the performance on snow and ice while maintaining the steering stability on a dry road surface.

Figure 5:
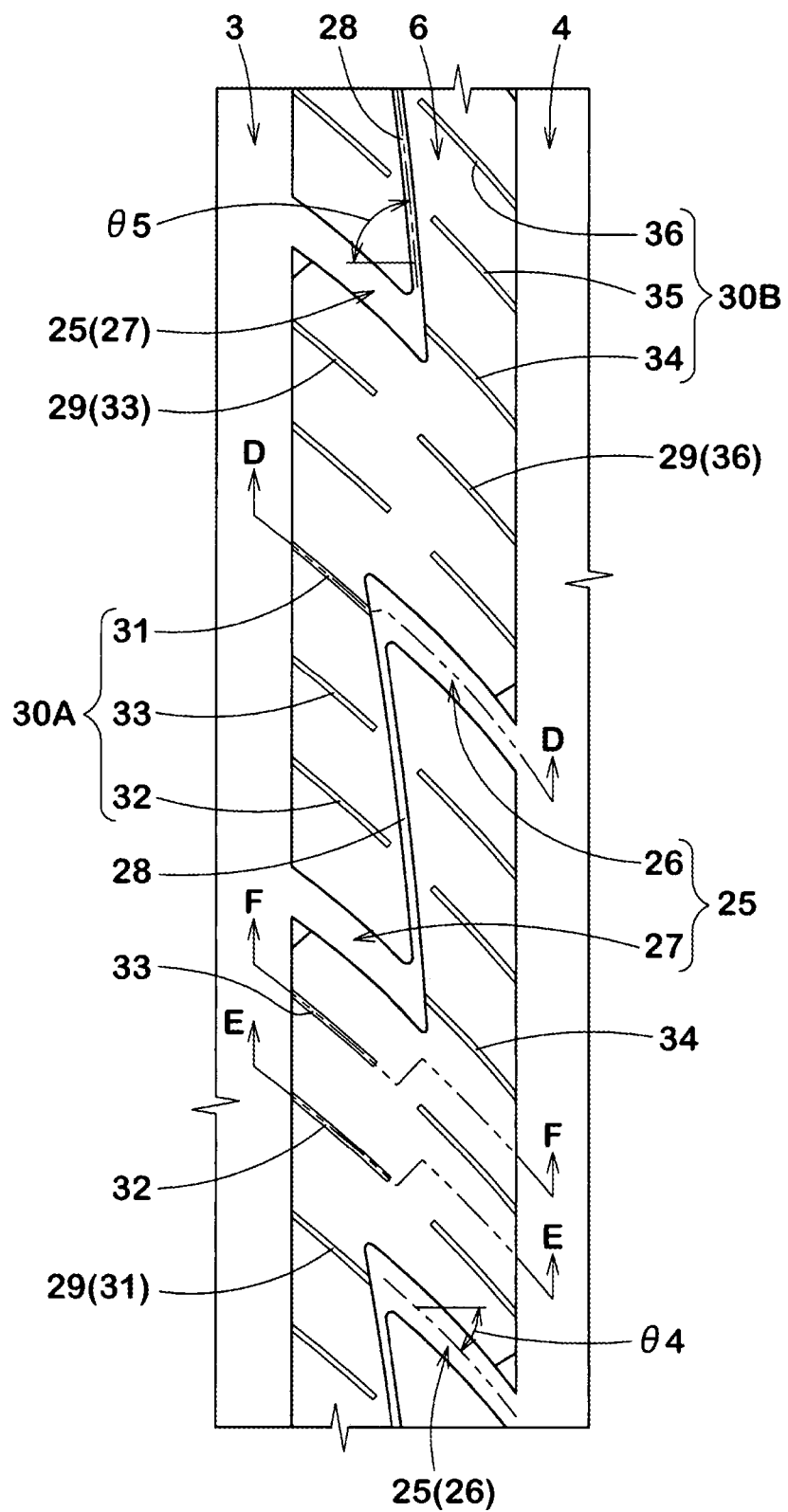
FIG. 5 is an enlarged view of a middle land portion of FIG. 1.

FIG. 5 illustrates an enlarged view of one of the middle land portions 6. As illustrated in FIG. 5, in each of the middle land portions 6, for example, multiple middle transverse grooves 25 and sipes 29 are provided.

The middle transverse grooves 25 include, for example, multiple first middle transverse grooves 26 that each extend from one of the crown main grooves 4 and terminate in one of the middle land portions 6, and multiple second middle transverse grooves 27 that each extend from one of the shoulder main grooves 3 and terminate in one of the middle land portions 6.

The first middle transverse grooves 26 and the second middle transverse grooves 27 desirably each cross, for example, a tire axial direction center position of one of the middle land portions 6. In other words, the first middle transverse grooves 26 and the second middle transverse grooves 27 respectively include portions overlapping each other in the tire axial direction. Such first middle transverse grooves 26 and second middle transverse grooves 27 can achieve both the steering stability on a dry road surface and the performance on snow and ice.

The first middle transverse grooves 26 and the second middle transverse grooves 27 are inclined in the same direction with respect to the tire axial direction. In a desirable embodiment, the middle transverse grooves 25 are inclined in an opposite direction with respect to the sipes arranged in the crown land portion 5. An angle (θ4) of each of the middle transverse grooves 25 with respect to the tire axial direction is desirably, for example, 35-45 degrees. Such middle transverse grooves 25 can provide a large frictional force also in the tire axial direction on snow and ice.

Figure 6A:
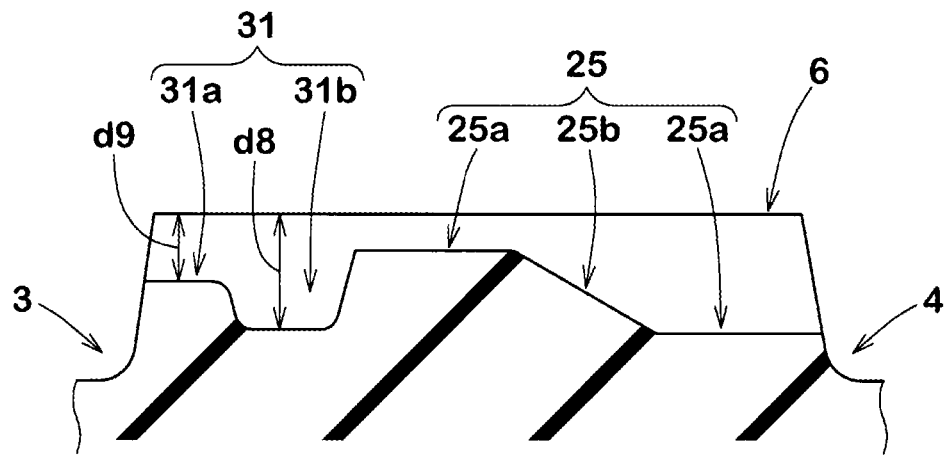
FIG. 6A is a D-D line cross-sectional view of FIG. 5.

FIG. 6A illustrates a D-D line cross-sectional view of one of the middle transverse grooves 25. FIG. 6A also includes a cross-sectional view of a sipe communicatively connected to the one of the middle transverse grooves 25. As illustrated in FIG. 6A, the middle transverse grooves 25 are desirably each gradually reduced in depth, for example, toward a center position of one of the middle land portions 6.

In a further desirable embodiment, the middle transverse grooves 25 each have an inclined bottom portion (25b) that obliquely extends between a pair of flat bottom portions (25a) that each extend at a constant depth. Such middle transverse grooves 25 can achieve excellent drainage performance while maintaining the rigidity of the middle land portions 6.

As illustrated in FIG. 5, in each of the middle land portions 6, middle longitudinal grooves 28 are desirably provided that respectively connect terminating ends of the first middle transverse grooves 26 to terminating ends of the second middle transverse grooves 27. The middle longitudinal grooves 28 each have, for example, smaller groove width and depth than those of each of the middle transverse grooves 25. The groove width of each of the middle longitudinal grooves 28 is desirably, for example, 0.8-2.0 mm. The depth of each of the middle longitudinal grooves 28 is desirably, for example, 1.5-2.5 mm. Such middle longitudinal grooves 28 can improve the turning performance on snow and ice while maintaining the steering stability on a dry road surface.

The middle longitudinal grooves 28 are inclined, for example, in the same direction as the middle transverse grooves 25 with respect to the tire axial direction. An angle (θ5) of each of the middle longitudinal grooves 28 with respect to the tire axial direction is desirably, for example, 75-85 degrees.

The sipes 29 provided in each of the middle land portions 6 are inclined, for example, in the same direction as the middle transverse grooves 25 with respect to the tire axial direction. In a more desirable embodiment, the sipes 29 extend parallel to the middle transverse grooves 25. Such sipes 29 can improve the performance on snow and ice while suppressing uneven wear of the middle land portions 6.

The sipes 29 provided in each of the middle land portions 6 are classified into, for example, a first sipe group (30A) including sipes communicatively connected to one of the shoulder main grooves 3 and a second sipe group (30B) including sipes communicatively connected to one of the crown main grooves 4.

The first sipe group (30A) includes, for example, first sipes 31 that each extend from one of the shoulder main grooves 3 to a terminating end of one of the middle transverse grooves 25, second sipes 32 that each have a larger tire axial direction length than that of each of the first sipes 31, and third sipes 33 that each have a smaller tire axial direction length than that of each of the second sipes 32. The second sipes 32 and the third sipes 33 each extend from one of the shoulder main grooves 3 and terminate in one of the middle land portions 6.

As illustrated in FIG. 6A, the first sipes 31 each include, for example, a shallow portion (31a) on the shoulder main groove 3 side and a deep portion (31b) on the middle transverse groove 25 side. A depth (d9) of the shallow portion (31a) is, for example, 0.50-0.65 times a depth (d8) of the deep portion (31b).

Figure 6B:
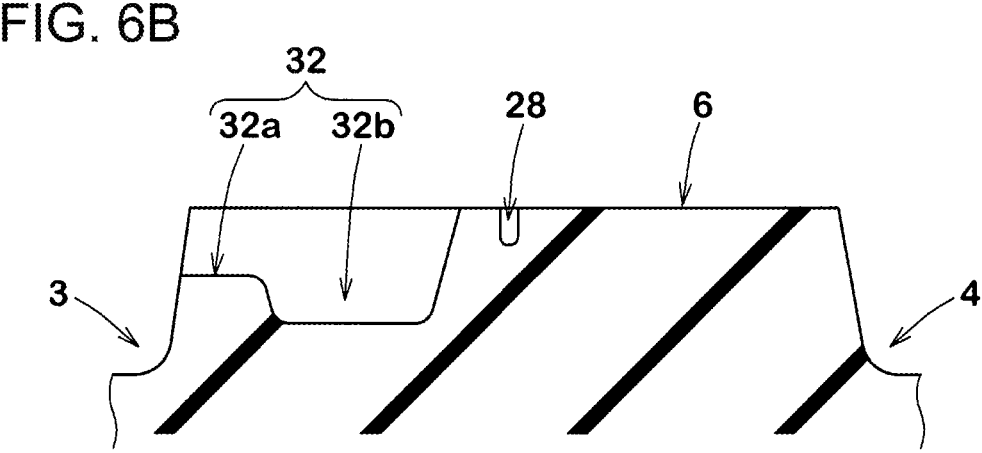
FIG. 6B is an E-E line cross-sectional view of FIG. 5.

FIG. 6B illustrates an E-E line cross-sectional view of one of the second sipes 32. As illustrated in FIG. 6B, the second sipes 32 each include, for example, a shallow portion (32a) on the shoulder main groove 3 side and a deep portion (32b) on the middle transverse groove 25 side. The shallow portion (32a) and the deep portion (32b) of each of the second sipes 32 respectively have, for example, the same depths as the shallow portion (31a) and the deep portion (31b) of each of the first sipes 31. Such second sipes 32 can achieve the above-described effects while suppressing uneven wear of the middle land portions 6.

Figure 6C:
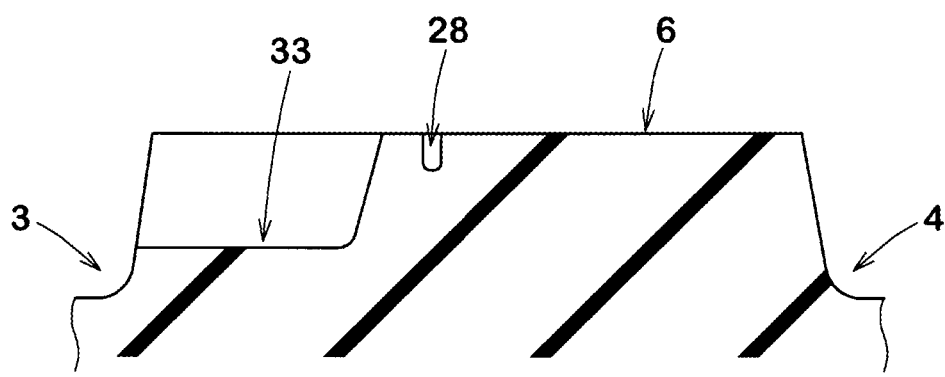
FIG. 6C is an F-F line cross-sectional view of FIG. 5.

FIG. 6C illustrates an F-F line cross-sectional view of one of the third sipes 33. As illustrated in FIG. 6C, the third sipes 33 desirably each have, for example, a constant depth. The third sipes 33 of the present embodiment are formed to each have, for example, the same depth as the deep portion of each of the first sipes 31 and the second sipes 32.

As illustrated in FIG. 5, the second ripe group (30B) includes, for example, fourth sipes 34 that each extend from one of the crown main grooves 4 to a terminating end of one of the middle transverse grooves 25, fifth sipes 35 that each have a smaller tire axial direction length than that of each of the fourth sipes 34, and sixth sipes 36 that each have a larger tire axial direction length than that of each of the fifth sipes 35. The fourth sipes 34 each have the same cross-sectional shape as the one of the first sipes 31 illustrated in FIG. 6A, and these structures can be applied. The fifth sipes 35 each have the same cross-sectional shape as the one of the third sipes 33 illustrated in FIG. 6C, and these structures can be applied. The sixth sipes 36 each have the same cross-sectional shape as the one of the second sipes 32 illustrated in FIG. 6B, and these structures can be applied.

The second sipes 32 and the third sipes 33, and the fifth sipes 35 and the sixth sipes 36, are desirably arranged at least on both sides of the middle longitudinal grooves 28. In the present embodiment, these sipes are also arranged in regions where the middle longitudinal grooves 28 are not arranged.

FIG. 7 illustrates an enlarged view of one of the shoulder land portions 7. As illustrated in FIG. 7, in each of the shoulder land portions 7, multiple shoulder transverse grooves 41 and multiple shoulder sipes 42 are provided.

The shoulder transverse grooves 41 each extend, for example, from one of the shoulder main grooves 3 to one of the tread edges (Te). The shoulder transverse grooves 41 are inclined, for example, in the same direction as the middle transverse grooves 25. An angle of each of the shoulder transverse grooves 41 with respect to the tire axial direction gradually decreases, for example, from the one of the shoulder main grooves 3 toward the tread edge (Te) side. A maximum angle (θ7) of each of the shoulder transverse grooves 41 with respect to the tire axial direction is desirably, for example, 20-35 degrees.

The shoulder transverse grooves 41 each include, for example, a first portion (41a) that extends from the one of the shoulder main grooves 3 at a constant groove width, and a second portion (41b) of which at least a portion gradually increases in groove width from the first portion (41a) toward the tread edge (Te) side. Such shoulder transverse grooves 41 can maintain the rigidity of the shoulder land portions 7 near the shoulder main grooves 3 and can improve the steering stability on a dry road surface.

The shoulder sipes 42 each extend, for example, from one of the shoulder main grooves 3 to one of the tread edges (Te). At least a portion of each of the shoulder sipes 42 of the present embodiment extends, for example, in a zigzag shape. Since, in the portion extending in a zigzag shape, sipe walls opposing each other are in contact with each other by meshing with each other, such shoulder sipes 42 can increase the rigidity of the land portions.

In the above, a tire according to an embodiment of the present invention is described in detail. However, without being limited to the above-described specific embodiment, the present invention can also be embodied in various modified forms.

EXAMPLES

Figure 8:
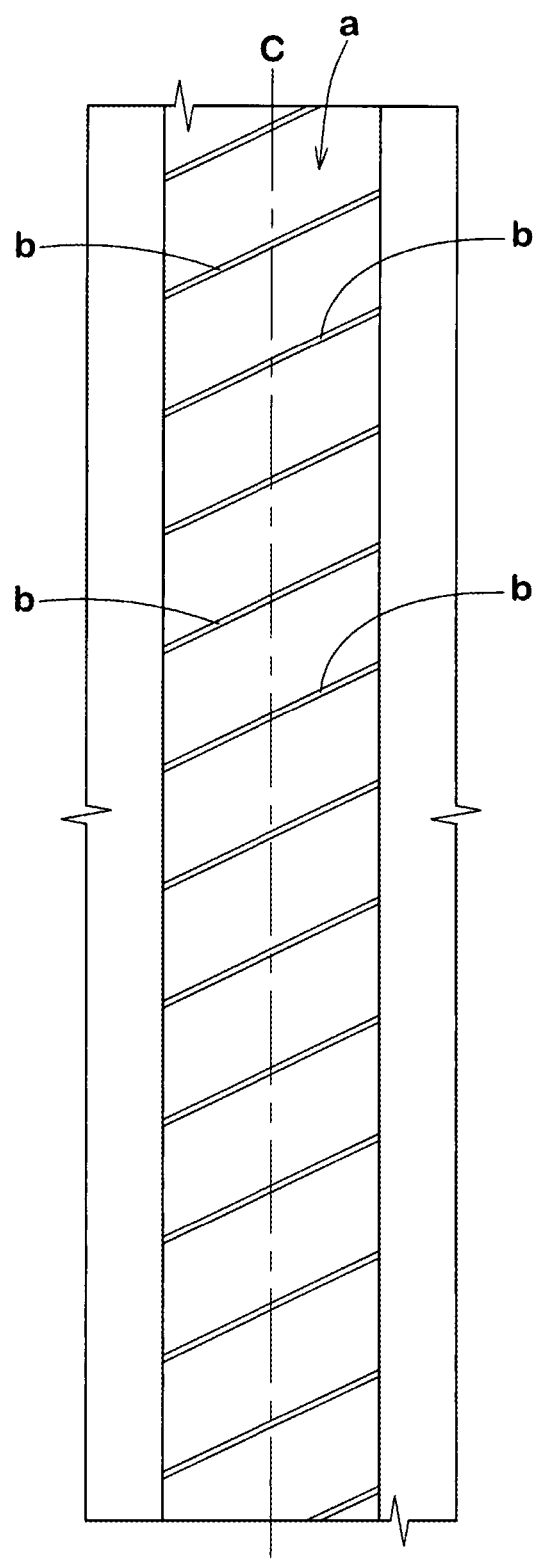
FIG. 8 is an enlarged view of a crown land portion of a tire of a comparative example.

Tires of size 215/60R16 each having the basic pattern of FIG. 1 are prototyped based on specifications shown in Table 1. As a comparative example, a tire is prototyped in which only long sipes (b) are provided in a crown land portion (a) as illustrated in FIG. 8. The tire of the comparative example has substantially the same structure as the pattern illustrated in FIG. 1 except for the structure of the crown land portion. Steering stability on a dry road surface and performance on snow and ice of each of the test tires are tested. Common specifications of the test tires and a test method are as follows.

Mounting rim: 16×6.5 J
Tire internal pressure: 240 kPa
Test vehicle: 4-wheel drive car; displacement: 2500 cc
Tire mounting positions: all wheels Steering Stability on Dry Road Surface Traveling performance when the test vehicle is traveling on a dry road surface is evaluated by a driver based on a sensory evaluation. The result is a score with the result of the comparative example as 100. A larger score indicates a better steering stability.

Performance on Snow and Ice

Traveling performance when the test vehicle is traveling on snow and ice is evaluated by the driver based on a sensory evaluation. The result is a score with the result of the comparative example as 100. A larger score indicates a better performance on snow and ice.

The test results are shown in Table 1.

steering stability on a dry road surface while maintaining the performance on snow and ice. That is, it is confirmed that the tire of the present invention can achieve both the steering stability on a dry road surface and the performance on snow and ice.

In order to improve traveling performance on snow and ice, various tires have been proposed in which sipes are provided in a land portion (for example, see Japanese Patent Laid-Open Publication No. 2017-144763).

As in the case of the tire of Japanese Patent Laid-Open Publication No. 2017-144763, when, in a land portion, multiple transverse sipes are provided extending across an entire width of the land portion, there is a tendency that rigidity of the land portion is significantly decreased and satisfactory steering stability on a dry road surface cannot be obtained. On the other hand, when the sipes are each reduced in length, there is a tendency that a sufficient frictional force on snow and ice cannot be obtained. Therefore, improvement has been demanded in conventional technologies regarding achieving both steering stability on a dry road surface and performance on snow and ice.

A tire according to an embodiment of the present invention can achieve both steering stability on a dry road surface and performance on snow and ice.

A tire according to an embodiment of the present invention has a tread part that includes a land portion having a tread surface formed between a first edge extending in a tire circumferential direction and a second edge extending in the tire circumferential direction. The land portion includes: long sipes each extending from the first edge to the second edge; middle sipes each extending from the first edge or the second edge and each terminating in the land portion at a point beyond a tire axial direction center position of the land portion; and short sipes each extending from the first edge or the second edge and each terminating in the land portion without extending to a point beyond the center position.

In a tire according to an embodiment of the present invention, the middle sipes desirably include first middle sipes each extending from the first edge, and the short sipes desirably include second short sipes each extending from the second edge.

In a tire according to an embodiment of the present invention, the short sipes are desirably respectively arranged on extension lines of the middle sipes or with ±2 mm deviations with respect to the extension lines.

In a tire according to an embodiment of the present invention, the long sipes desirably each include a shallow portion and a deep portion having a larger depth than the shallow portion.

TABLE 1

|  | Comparative Example | Example 1 | Example 2 | Example 3 | Example 4 | Example 5 | Example 6 | Example 7 | Example 8 | Example 9 |
|---|---|---|---|---|---|---|---|---|---|---|
| Figure illustrating crown land portion | FIG. 8 | FIG. 1 | FIG. 1 | FIG. 1 | FIG. 1 | FIG. 1 | FIG. 1 | FIG. 1 | FIG. 1 | FIG. 1 |
| (Middle sipe length L4)/(Crown land portion width W2) | — | 0.60 | 0.55 | 0.58 | 0.65 | 0.70 | 0.60 | 0.60 | 0.60 | 0.60 |
| (Short sipe length L5)/(Crown land portion width W2) | — | 0.23 | 0.23 | 0.23 | 0.23 | 0.23 | 0.15 | 0.20 | 0.25 | 0.30 |
| Steering stability on dry road surface (score) | 100 | 108 | 109 | 108 | 107 | 105 | 109 | 108 | 108 | 106 |
| Performance on snow and ice (score) | 100 | 98 | 96 | 98 | 98 | 99 | 97 | 98 | 98 | 99 |

As a result of the test, as compared to the tire of the comparative example, the tires of the examples improve the In a tire according to an embodiment of the present invention, in the land portion, the long sipes desirably include multiple kinds of long sipes which are different from each other in tire axial direction position at which the shallow portion is provided.

In a tire according to an embodiment of the present invention, the deep portion desirably crosses the center position.

In a tire according to an embodiment of the present invention, the long sipes, the middle sipes and the short sipes are desirably inclined in the same direction with respect to the tire axial direction.

In a tire according to an embodiment of the present invention, the middle sipes desirably include second middle sipes each extending from the second edge, and the short sipes desirably include first short sipes each extending from the first edge.

In a tire according to an embodiment of the present invention, in the land portion, shallow grooves are desirably provided respectively connecting terminating ends of the first middle sipes to terminating ends of the second middle sipes.

In a tire according to an embodiment of the present invention, in the land portion, sipes of the same kind are desirably not continuously arranged in the tire circumferential direction.

The land portion of the tread part of a tire according to an embodiment of the present invention includes the long sipes each extending from the first edge to the second edge, the middle sipes each extending from the first edge or the second edge and each terminating in the land portion at a point beyond the tire axial direction center position of the land portion, and the short sipes each extending from the first edge or the second edge and each terminating in the land portion without extending to a point beyond the center position.

The sipes can increase a frictional force with edges thereof when traveling on snow and ice. Since the middle sipes each terminate at a point beyond the center position of the land portion, a relatively large frictional force is generated near the center position while excessive reduction in rigidity of the land portion is suppressed. Since the short sipes each terminate without extending to a point beyond the center position of the land portion, reduction in rigidity of the land portion can be significantly suppressed and steering stability on a dry road surface can be maintained. Further, the sipes each have one end communicatively connected to the first edge or the second edge, and thus can moderately open and can increase a frictional force on snow and ice. Therefore, a tire according to an embodiment of the present invention can achieve both steering stability on a dry road surface and performance on snow and ice.

Obviously, numerous modifications and variations of the present invention are possible in light of the above teachings. It is therefore to be understood that within the scope of the appended claims, the invention may be practiced otherwise than as specifically described herein.

What is claimed is:

1. A tire, comprising:
a tread part including a land portion such that the land portion has a tread surface formed between a first edge extending in a tire circumferential direction and a second edge extending in the tire circumferential direction,
wherein the land portion includes a plurality of long sipes, a plurality of middle sipes, and a plurality of short sipes such that each of the long sipes is extending from the first edge to the second edge, that each of the middle sipes is extending from one of the first edge and the second edge and terminating in the land portion at a point beyond a tire axial direction center position of the land portion, and that each of the short sipes is extending from one of the first edge and the second edge and terminating in the land portion without extending to a point beyond the center position, the plurality of middle sipes includes a plurality of first middle sipes and a plurality of second middle sipes such that each of the first middle sipes is extending from the first edge and that each of the second middle sipes is extending from the second edge, the plurality of short sipes includes a plurality of first short sipes and a plurality of second short sipes such that each of the first short sipes is extending from the first edge and that each of the second short sipes is extending from the second edge, and the land portion has a plurality of shallow grooves connecting terminating ends of the first middle sipes to terminating ends of the second middle sipes, respectively.

2. The tire according to claim 1, wherein the short sipes are formed on extension lines of the middle sipes or with ±2 mm deviations with respect to the extension lines, respectively.

3. The tire according to claim 2, wherein each of the long sipes includes a shallow portion and a deep portion having a depth greater than a depth of the shallow portion.

4. The tire according to claim 2, wherein the plurality of long sipes, the plurality of middle sipes and the plurality of short sipes are inclined in the same direction with respect to the tire axial direction.

5. The tire according to claim 2, wherein the long sipes, middle sipes and short sipes are not continuously formed such that a same kind of sipes is not continuously formed in the tire circumferential direction.

6. The tire according to claim 1, wherein each of the long sipes includes a shallow portion and a deep portion having a depth greater than a depth of the shallow portion.

7. The tire according to claim 6, wherein the plurality of long sipes includes multiple kinds of long sipes which are different from each other in tire axial direction position at which the shallow portion is formed.

8. The tire according to claim 7, wherein the deep portion crosses the center position of the land portion.

9. The tire according to claim 6, wherein the deep portion crosses the center position of the land portion.

10. The tire according to claim 6, wherein the plurality of long sipes is formed such that the shallow portion of each of the long sipes has a tire axial direction length L3 in a range of 0.35 to 0.45 times a tire axial direction width W2 of the land portion.

11. The tire according to claim 6, wherein the plurality of long sipes is formed such that the shallow portion of each of the long sipes has a depth d3 in a range of 0.50 to 0.65 times a depth d2 of the deep portion.

12. The tire according to claim 1, wherein the plurality of long sipes, the plurality of middle sipes and the plurality of short sipes are inclined in the same direction with respect to the tire axial direction.

13. The tire according to claim 1, wherein the long sipes, middle sipes and short sipes are not continuously formed such that a same kind of sipes is not continuously formed in the tire circumferential direction.

14. The tire according to claim 1, wherein the plurality of long sipes is formed such that each of the long sipes has an angle θ1 in a range of 20 to 30 degrees with respect to the tire axial direction.

15. The tire according to claim 1, wherein the plurality of middle sipes is formed such that each of the middle sipes has an angle $\theta 2$ in a range of 20 to 30 degrees with respect to the tire axial direction, and the plurality of short sipes is formed such that each of the short sipes has an angle $\theta 3$ in a range of 20 to 30 degrees with respect to the tire axial direction.

16. The tire according to claim 1, wherein the land portion has a plurality of lug grooves formed at end portions of the middle sipes such that the plurality of lug grooves are connected to the plurality of middle sipes.

17. The tire according to claim 1, wherein the tread part includes a middle land portion, and the middle land portion has a plurality of middle transverse grooves formed such that each of the middle transverse grooves has a first middle transverse groove and a second middle transverse groove and that the first middle transverse groove and the second middle transverse groove have portions overlapping each other in the tire axial direction.

18. The tire according to claim 17, wherein the middle land portion has a plurality of middle longitudinal grooves formed such that each of the middle longitudinal grooves is connecting a terminal end of the first middle transverse groove and a terminal end of the second middle transverse groove.

19. The tire according to claim 18, wherein the plurality of middle longitudinal grooves is formed such that each of the middle longitudinal grooves has an angle $\theta 5$ in a range of 75 to 85 degrees with respect to the tire axial direction.

20. The tire according to claim 1, wherein the tread part includes a shoulder land portion, and the shoulder land portion has a plurality of shoulder transverse grooves formed such that each of the shoulder transverse grooves has a first portion having a constant width, and a second portion having at least a portion gradually increasing in groove width from the first portion toward a tread edge of the tread part.

* * * * *